Nov. 18, 1958  C. W. SMITH  2,860,683
RIM STRUCTURE FOR DEMOUNTABLE SOLID TIRES
Filed Jan. 26, 1955  2 Sheets-Sheet 2

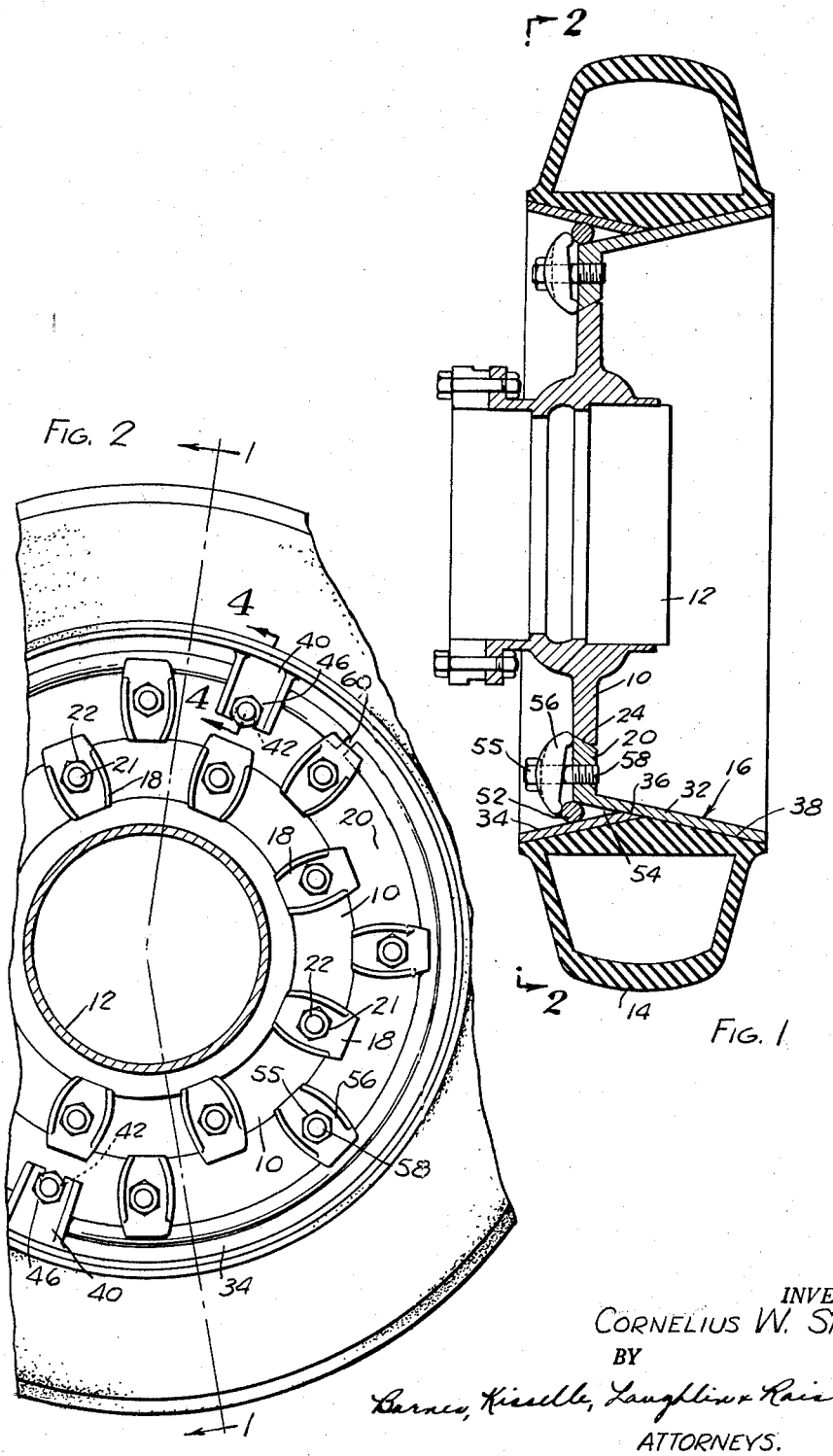

INVENTOR.
CORNELIUS W. SMITH
BY
ATTORNEYS

United States Patent Office 2,860,683
Patented Nov. 18, 1958

2,860,683

RIM STRUCTURE FOR DEMOUNTABLE SOLID TIRES

Cornelius W. Smith, Grosse Pointe Farms, Mich.

Application January 26, 1955, Serial No. 484,150

6 Claims. (Cl. 152—402)

This invention relates to vehicle wheels and more particularly to vehicle wheel rim structure adapted for demountably supporting solid tires.

Many vehicles, such as trucks, for example, are provided with wheels having solid rubber tires. Solid tires are usually mounted on vehicle wheels by forcing a band on which the tire is bonded over a wheel of a slightly larger outside diameter by means of a special press. Such presses are usually limited in use to pressing used solid tires off and new ones on to wheels. This operation also requires other special tools which are limited in their usefulness to such service. Such specialized equipment is necessarily quite costly, and the operation of changing solid rubber tires is necessarily a relatively expensive one.

It is therefore an object of this invention to provide a rim structure or adapter for a solid rubber tire which is designed such that a solid tire may be mounted on or removed from a vehicle wheel in a very short time by inexperienced personnel with conventional inexpensive tools.

A further object of the invention resides in the provision of a rim structure or adapter for solid tires which is designed such that a close tolerance is required of only a minimum number of dimensions, thus enabling economical manufacture.

Another object of the invention resides in the provision of a rim structure or adapter for solid tires which includes a pair of half sections and means for holding the sections together by means of a wedging action.

In the drawings:

Fig. 1 is a vertical axial section through a wheel on which a solid tire adapter of this invention is mounted, said section being taken generally along the lines 1—1 in Fig. 2.

Fig. 2 is a fragmentary front elevational view of the wheel as viewed along the lines 2—2 in Fig. 1.

Figure 3:
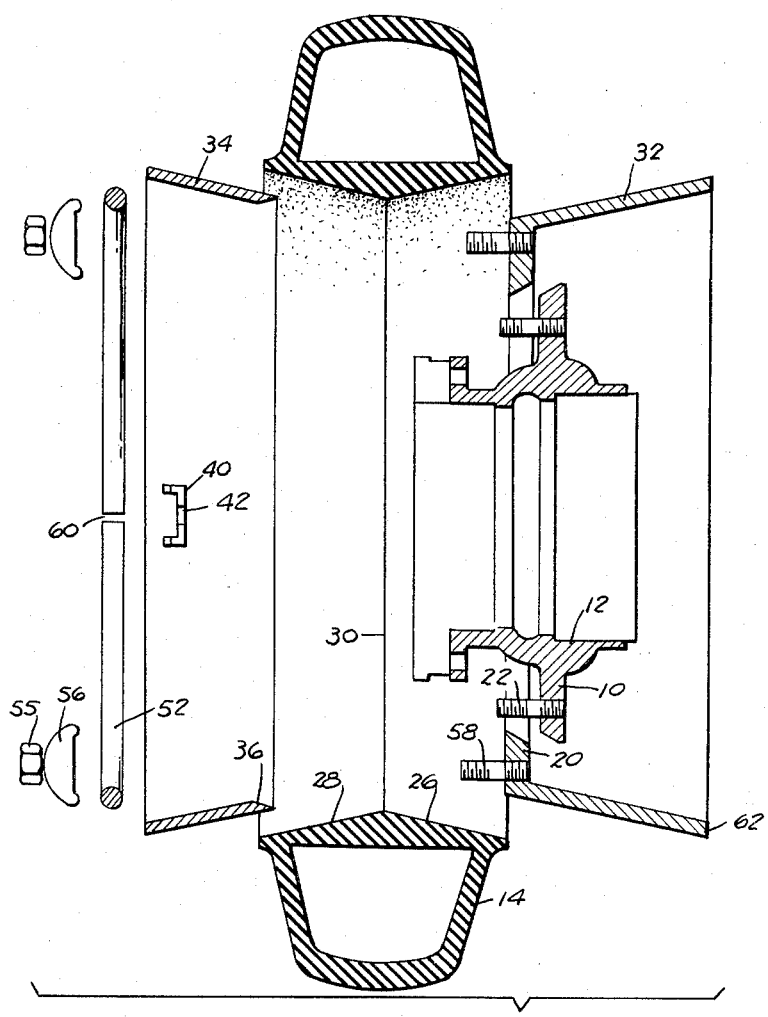
Fig. 3 is an exploded sectional view of the wheel illustrating the manner in which the various components are assembled together.

In the drawings, there is illustrated a vehicle wheel which includes a disc member 10 provided with a hub 12 at the center thereof. The solid rubber tire 14 is mounted on the disc 10 by the rim structure or adapter of this invention which is generally designated 16. The present invention is not concerned with the manner in which the adapter 16 is mounted on the disc 10. Rather, it relates to the construction of and the manner in which the adapter 16 supports the tire 14. For the purposes of illustration, the adapter 16 is illustrated as being mounted on the disc 10 by means of a series of circumferentially arranged lugs 18 around disc 10 which are arranged to be drawn tightly against the outer faces of disc 10 and the annular flange 20 of adapter 16 by means of nuts 21 on studs 22. The tightening of nuts 21 produces a firm engagement of the adapter 16 and disc 10 at the co-planar tapered faces 24.

As is clearly illustrated in Figs. 1 and 3, tire 14 has its inner periphery defined by a pair of frusto-conical faces 26 and 28 which are oppositely inclined and intersect as at 30 generally at the central radial plane of the wheel. Adapter 16 includes a pair of annular rim members 32 and 34. The rim members 32 and 34 are also frusto-conical in shape, the inclination of the peripheral walls thereof corresponding to the inclination of the faces 26 and 28 of tire 14. Member 32 is adapted to be brought into co-planar engagement with the face 26 of the tire and the member 34 with the face 28 of the tire. Member 32 has an axial extent substantially greater than the axial extent of face 26 of the tire. Member 34 has its axially inner edge provided with a bevel face 36 which is machined to a close tolerance to interfit with and seat upon the radially outer face 38 of member 32. It will be appreciated that regardless of the manner in which the members 32 and 34 are formed, whether by casting, stamping, rolling, etc., it is a relatively simple matter to accurately control the angularity of these members with respect to the axis of the wheels. With this in mind, the diameter of bevel face 36 is accurately machined to within a close tolerance such that when the rim member 34 is positioned in telescoping relation on member 32 as illustrated in Fig. 1, the bevel face 36 engages the face 38 of member 32 to limit the extent to which the members 32 and 34 may be drawn together to a position wherein the member 34 terminates on the member 32 in the central radial plane of the tire. In other words, the movement of members 32 and 34 towards each other is limited by the bevel face 36 to a position wherein the members 32 and 34 define an annular groove which is V-shaped in cross section and which is also dimensioned and shaped to correspond with the configuration and dimensions of the faces 26 and 28 of the tire.

Figure 4:
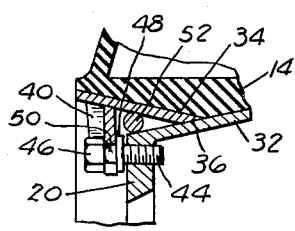
Fig. 4 is a sectional view along the lines 4—4 in Fig. 2.

Referring now to Figs. 2 and 4, means for drawing the two rim members 32 and 34 together is illustrated. These means include a pair of diametrically opposed lugs 40 fixedly supported on the inner face of rim member 34. The lugs 40 project radially inwardly from rim member 34 and at their radially inner ends are formed with U-shaped notches 42 which receive jack screws 44. Screws 44 are provided with spaced apart heads 46 and collars 48 which define therebetween a neck portion 50 engageable within the U-shaped openings 42 of the lugs 40. The shanks of jack screws 44 are threaded for engagement with suitable openings in the flange 20 of rim member 32. The jack screws 44 are provided for drawing the two rim members 32 and 34 inwardly toward each other to the position shown in Fig. 1. These members are arranged to be locked in this position by means of a wedging ring 52 which is adapted to be inserted into the circumferentially extending, wedge-shaped groove 54 formed between the overlapping portions of the members 32 and 34. Lugs 56 on the radial flange 20 are adapted to drive the wedge ring 52 in a direction inwardly of groove 54 by means of nuts 55 on studs 58 threadedly engaged in flange 20. It will be observed that ring 52 is engaged behind lugs 40. In order to permit the ring to be inserted within member 32 behind lugs 40 and to eliminate the necessity of close tolerances, the ring is split as at 60.

The operation of mounting a tire such as shown at 14 on an adapter 16 is as follows: The tire is first slipped over the smaller diameter end of the member 32. Member 32 is preferably dimensioned such that the tire will come to rest at a position where the edge 62 of the member 32 will project axially slightly beyond the adjacent side edge of the tire. Thereafter, the rim member 34 with the wedge ring 52 is slipped over the inner end of member 32, the bevel face 36 foremost. The rim member 34 will come to rest at a position on tire 14 wherein the bevel face 36 is spaced slightly from the outer face 38 of member 32 at a plane adjacent the radial center line 30 of the tire. Jack screws 42 are then turned by means of an ordinary tire wrench to draw the two rim members 32 and 34 together. The member 34 is moved axially toward the member 32 until the bevel face 36 contacts the outer face 38 of member 32. This limits the axial movement of members 32 and 34 relatively toward each other. In this position, the member 34 contacts the member 32 at the bevel face 36 along a line corresponding to the radial central line 30 of the tire. In this position, the tire is slightly expanded and engaged between members 32 and 34 with sufficient pressure to prevent circumferential slippage of the tire relative to the adapter 16.

The members 32 and 34 are clamped rigidly in this position by arranging the lugs 56 so that one end of each lug engages the flange 20 and the other end, the ring 52 as illustrated; and the nuts 55 are tightened down on studs 58 by means of a conventional tire wrench. Tightening of nuts 55 causes the ring 52 to be driven in a direction inwardly of the wedge-shaped groove 54 between members 32 and 34. Wedge ring 52 is thus brought into firm engagement with the opposing faces of members 32 and 34 at groove 54 to firmly clamp the members 32 and 34 together. At the same time, the wedge ring 52 adds rigidity to the wheel as a whole by forming a non-yielding support between members 32 and 34 in a plane parallel to the plane of flange 20.

It will be appreciated that when it is desired to remove a tire that is mounted on an adapter 16, the procedure described above is reversed. In particular, it will be noted that when jack screws 46 are loosened, collars 48 cause the members 32 and 34 to separate, thus breaking usual bond between the rim and tire that usually results from the mounting of a tire on a rim for a substantial period of time.

Thus, it will be seen that I have provided an adapter or rim structure for demountable solid tires which is not only economical in its manufacture but which in addition permits the operation of mounting or removing a tire from the adapter to be performed with conventional, inexpensive tools in a relatively short time. It will be appreciated that since the angularity of the members 32 and 34 is maintained to close limits, the only dimension that must be held to a close tolerance is the diameter of the bevel face 36. Accurate machining of this bevel face together with the maintaining of the angles of the members 32 and 34 to within close limits will automatically determine to a close tolerance the edge and center line dimensions of the adapter relative to the tire.

I claim:

1. Wheel rim structure for detachably mounting a solid tire, the inner periphery of which is defined by two oppositely inclined frusto-conical surfaces which intersect generally at the radial central plane of the tire to define the minimum inner diameter of the tire, comprising a pair of rim members each having axially extending annular portions which are inclined to correspond with the inclination of said frusto-conical surface, one of said axially extending annular portions having an axial extent corresponding generally with the axial extent of one of said frusto-conical surfaces and having a diameter at its smaller end corresponding to said minimum inner diameter of the tire, the other axially extending annular portion of frusto-conical shape having an axial extent greater than the other frusto-conical surface of the tire and having a diameter at its smaller end less than said minimum inner diameter whereby said rim members may be telescoped into engagement with one another from opposite faces of the tire to form a V-shaped annular groove therebetween in which said frusto-conical faces of the tire are firmly engaged, said smaller end portion of said other axially extending annular portion forming with said one axially extending annular portion an annular groove which is wedge-shaped in axial section, wedge means in said groove engaging the adjacent faces of said axially extending annular portions forming said groove to firmly hold the rim members in said telescoping relation in engagement with the tire, and means on said two rim members for drawing the rim members axially toward one another, the smaller end of said one axially extending annular portion being fashioned with a bevel face, said bevel face being inclined to correspond with the inclination of said other axially extending annular portion and being dimensioned to engage the outer peripheral face of said other axially extending annular portion to thereby limit the movement of said portions toward each other to a position wherein the annular V-shaped groove formed between said axially extending annular portion conforms in size and shape to the inner peripheral surface of the tire.

2. Wheel rim structure for detachably mounting a solid tire, the inner periphery of which is defined by two oppositely inclined frusto-conical surfaces which intersect generally at the radial central plane of the tire to define the minimum inner diameter of the tire, comprising a pair of rim members each having axially extending annular portions which are inclined to correspond with the inclination of said frusto-conical surface, one of said axially extending annular portions having an axial extent corresponding generally with the axial extent of one of said frusto-conical surfaces and having a diameter at its smaller end corresponding to said minimum inner diameter of the tire, the other axially extending annular portion of frusto-conical shape having an axial extent greater than the other frusto-conical surface of the tire and having a diameter at its smaller end less than said minimum inner diameter whereby said rim members may be telescoped into engagement with one another from opposite faces of the tire to form a V-shaped annular groove therebetween in which said frusto-conical faces of the tire are firmly engaged, said smaller end portion of said other axially extending annular portion forming with said one axially extending annular portion an annular groove which is wedge-shaped in axial section, wedge means in said groove engaging the adjacent faces of said axially extending annular portions forming said groove, means for driving said wedge means into said groove to firmly hold the rim members in said telescoping relation and to prevent axial relative movement thereof and additional means interengaging said two rim members for drawing the rim members axially toward one another.

3. Wheel rim structure as called for in claim 2 wherein the smaller end of said one axially extending annular portion is fashioned with a bevel face, said bevel face being inclined to correspond with the inclination of said other axially extending annular portion and being dimensioned to engage the outer peripheral face of said other axially extending annular portion to thereby limit the movement of said portions toward each other to a position wherein the annular V-shaped groove formed between said axially extending annular portion conforms in size and shape to the inner peripheral surface of the tire.

4. Wheel rim structure as called for in claim 2 wherein said wedge means comprises, a ring member having a mean diameter corresponding generally with the mean diameter of said annular wedge-shaped groove.

5. Wheel rim structure as called for in claim 2 wherein said wedge means comprises a ring member having a mean diameter corresponding generally with the mean diameter of said annular wedge-shaped groove and said driving means comprises a plurality of lugs supported on one of said rim members and engaging said ring member and threaded members for shifting said lugs in a direction to urge said ring member axially into said wedge-shaped groove.

6. Wheel rim structure as called for in claim 2 wherein said smaller end of said one rim member is provided with a radially inwardly extending flange, said means for drawing said rim members axially together comprising a plurality of lugs on said flange engaging said wedge means and threaded members on said flange for shifting said lugs in a direction to urge said wedge means axially into said wedge-shaped groove.

References Cited in the file of this patent

UNITED STATES PATENTS

| | | |
|---|---|---|
| 1,158,850 | Renne | Nov. 2, 1915 |
| 1,595,335 | Atkins | Aug. 10, 1926 |
| 1,957,690 | Brousseau | May 8, 1934 |
| 2,709,471 | Smith et al. | May 31, 1955 |

FOREIGN PATENTS

| | | |
|---|---|---|
| 21,440 | Great Britain | of 1911 |